United States Patent [19]

Ou

[11] Patent Number: 4,795,051
[45] Date of Patent: Jan. 3, 1989

[54] RUPTURABLE FLUID PRESSURE RELIEF APPARATUS AND MANUFACTURING METHOD

[75] Inventor: Sam A. Ou, Stanton, Calif.

[73] Assignee: RS&B Safety Systems, Inc., Tulsa, Okla.

[21] Appl. No.: 598,807

[22] Filed: Apr. 10, 1984

Related U.S. Application Data

[63] Continuation-in-part of Ser. No. 381,634, May 24, 1982, abandoned.

[51] Int. Cl.$^4$ .................... B21D 53/00; F16K 17/40
[52] U.S. Cl. .................. 220/89 A; 29/157.1 R; 29/428; 137/68.1
[58] Field of Search .................. 220/89 A; 137/68 R, 137/68.1; 29/157.1 R, 428

[56] References Cited

U.S. PATENT DOCUMENTS

| | | | |
|---|---|---|---|
| 2,224,748 | 12/1940 | Sauer | 220/89 A |
| 2,954,897 | 10/1960 | Hansen et al. | 220/89 A |
| 3,005,573 | 10/1961 | Dawson et al. | 220/89 A |
| 3,091,359 | 5/1963 | Wood | 220/89 A |
| 3,469,733 | 9/1969 | Montgomery et al. | 220/89 A |
| 3,484,817 | 12/1969 | Wood | 220/89 A |
| 3,526,336 | 9/1970 | Wood | 220/89 A |
| 3,658,206 | 4/1972 | Barbier | 220/89 A |
| 3,685,686 | 8/1972 | Raidl | 220/89 A |
| 3,698,598 | 10/1972 | Wood et al. | 137/68 R X |
| 4,119,236 | 10/1978 | Shaw et al. | 220/89 A |
| 4,146,047 | 3/1979 | Wood et al. | 220/89 A X |
| 4,245,749 | 1/1981 | Graves | 220/89 A X |
| 4,278,181 | 7/1981 | Wood et al. | 220/89 A |
| 4,345,611 | 8/1982 | Ikeda et al. | 220/89 A X |

Primary Examiner—Allan N. Shoap
Attorney, Agent, or Firm—Laney, Dougherty, Hessin & Beavers

[57] ABSTRACT

A rupturable fluid pressure relief apparatus and method of manufacturing such apparatus capable of rupturing in either the normal or reverse rupture modes at predetermined rupture pressures are provided. The apparatus is basically comprised of a circular rupture disk positioned between a pair of annular rupture pressure control members. The rupture pressure control members include centrally positioned circular openings therein of sizes such that the rupture disk ruptures at predetermined rupture pressures or pressure differentials exerted from either side of the rupture disk.

22 Claims, 3 Drawing Sheets

RUPTURABLE FLUID PRESSURE RELIEF APPARATUS AND MANUFACTURING METHOD

CROSS REFERENCE TO RELATED APPLICATION

This application is a continuation-in-part of application Ser. No. 381,634, filed May 24, 1982, abandoned.

BACKGROUND OF THE INVENTION

1. Field of the Invention

The present invention relates to rupturable fluid pressure relief apparatus and methods of manufacturing such apparatus, and more particularly, but not by way of limitation, to improved rupturable fluid pressure relief apparatus capable of rupturing in either the normal or reverse rupture modes.

2. Description of the Prior Art

A variety of rupturable pressure relief apparatus have been developed and used heretofore. Generally, these devices include a rupture disk supported betweem a pair of complementary support members or flanges which are in turn connected to a relief connection in a vessel or system containing fluid pressure. When the fluid pressure within the vessel or system exceeds the design rupture pressure of the rupture disk, rupture occurs allowing fluid pressure to be relieved from the vessel or system. The term "rupture pressure" is used herein to mean the fluid pressure or fluid pressure differential exerted on or across the rupture disk which causes the rupture disk to rupture.

Most of the rupturable pressure relief apparatus of the prior art is designed for failure in one direction. That is, the apparatus is installed in a pressurized system between first and second pressure zones, so that when excess pressure occurs in the first zone, it is vented to the second zone. This is referred to as the "normal rupture mode".

In some applications of rupturable pressure relief apparatus it is not only necessary that the apparatus relieve fluid pressure in the normal rupture mode, i.e., from the first zone to the second zone, but also that the apparatus relieve fluid pressure in the reverse direction, i.e., from the second zone to the first zone. This is referred to as the "reverse rupture mode".

Heretofore, rupturable pressure relief apparatus have been developed and utilized which relieve pressure in both the normal and reverse rupture modes. For example, U.S. Pat. Nos. 3,091,359 to Wood and 4,301,938 to Wood et al. are directed to safety pressure relief devices which can relieve fluid pressure in either direction. However, these devices as well as rupturable fluid pressure relief apparatus designed to rupture in the normal rupture mode only are caused to rupture at a predetermined rupture pressure by the configuration, thickness and the type of material or materials utilized to form the rupture disk or one or more rupturable members in the devices. That is, the prior art rupturable fluid pressure relief apparatus are all generally designed to open fully upon rupture and the size of the rupturable member or members of the apparatus and the fluid flow passageway provided by the support members are as large as possible depending upon the nominal size of the apparatus. In order to produce rupturable fluid pressure relief apparatus of the same nominal size having different predetermined rupture pressures, the strength of the rupturable member or members has heretofore been changed to change the rupture pressure, i.e., the changing of the strength of the rupturable member or members has been accomplished by changing the material from which the rupturable member or members are formed, changing the thickness of the material utilized, changing the configuration of the rupturable member or members whereby they are weakened, etc. This requires the manufacturer to have on hand a great variety of materials and a variety of tooling which in turn causes the manufacturing process of prior art rupturable pressure relief apparatus to be costly.

By the present invention an improved rupturable fluid pressure relief apparatus and method of manufacturing such apparatus are provided wherein rupture disks of the same configuration, material and thickness are utilized in support members of the same nominal size, but the rupture pressures of the rupture disks are selectively differed by including different rupture pressure control members in the apparatus. That is, the particular normal and reverse rupture mode rupture pressures of individual apparatus are set by annular rupture pressure control members having centrally positioned openings therein of sizes less than the sizes of the openings in the support members positioned on opposite sides of the rupture disk. The particular size of the openings in the control members determines the particular normal and reverse rupture pressures which cause the rupture of the rupture disk.

Thus, by the present invention identical rupture disks, i.e., rupture disks of the same material, thickness, etc., can be utilized in identical support members to form apparatus having a variety of normal and reverse rupture mode rupture pressures thereby substantially reducing the manufacturing costs of the apparatus.

SUMMARY OF THE INVENTION

A rupturable fluid pressure relief apparatus capable of rupturing in either the normal or reverse rupture modes at predetermined rupture pressures and adapted to be clamped between a pair of annular support members comprised of a circular rupture disk, a first annular rupture pressure control member positioned adjacent the rupture disk including a centrally positioned opening therein of a size smaller than the sizes of the openings in the support members but of a particular size such that the rupture disk ruptures at a predetermined rupture pressure exerted on the side of the rupture disk opposite the control member, and a second annular rupture pressure control member positioned adjacent the rupture disk on the opposite side thereof from the first rupture pressure control member including a centrally positioned circular opening of a size smaller than the sizes of the openings in the support members but of a particular size such that the rupture disk ruptures at a predetermined rupture pressure exerted on the side of the rupture disk opposite the second control member. Methods of manufacturing the rupturable fluid pressure relief apparatus are also provided.

It is, therefore, a general object of the present invention to provide improved rupturable pressure relief apparatus and methods of manufacturing the apparatus.

A further object of the present invention is the provision of rupturable fluid pressure relief apparatus capable of rupturing in either the normal or reverse rupture modes while having a minimum number of parts.

Yet a further object of the present invention is the provision of rupturable fluid pressure relief apparatus wherein identical rupture disks can be utilized in the manufacture of apparatus having different normal and reverse rupture mode rupture pressures.

Still a further object of the present invention is the provision of rupturable fluid pressure relief apparatus capable of rupturing in either the normal or reverse rupture modes at predetermined rupture pressures which is inexpensive to manufacture as compared to prior art apparatus.

Other and further objects, features and advantages of the present invention will be readily apparent to those skilled in the art upon a reading of the description of preferred embodiments which follows when taken in conjunction with the accompanying drawings.

DESCRIPTION OF THE PREFERRED EMBODIMENTS

Figure 1:
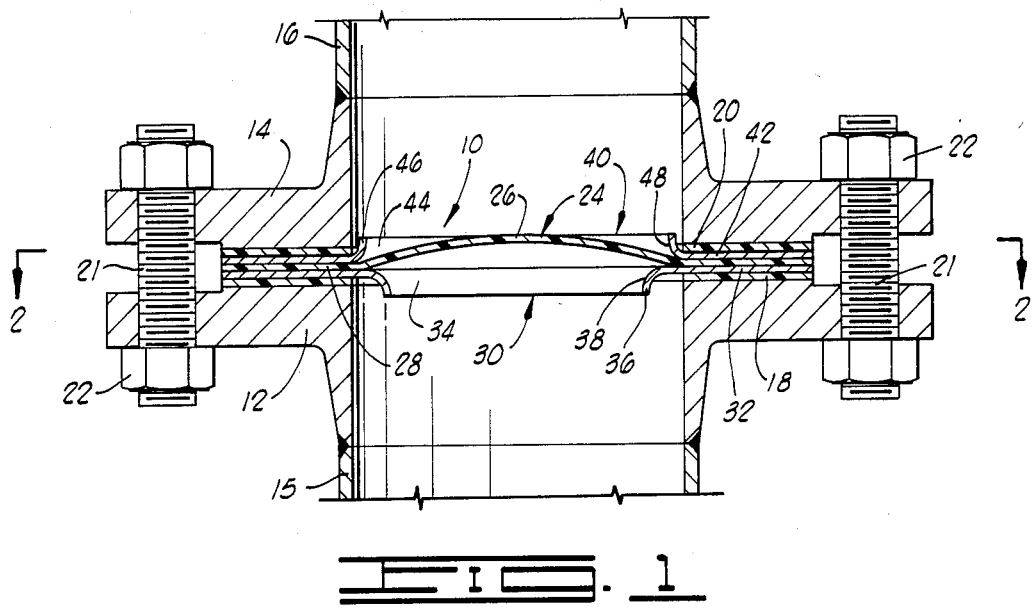
FIG. 1 is a side cross-sectional view of one form of the apparatus of the present invention clamped between conventional pipe flanges.
Figure 2:
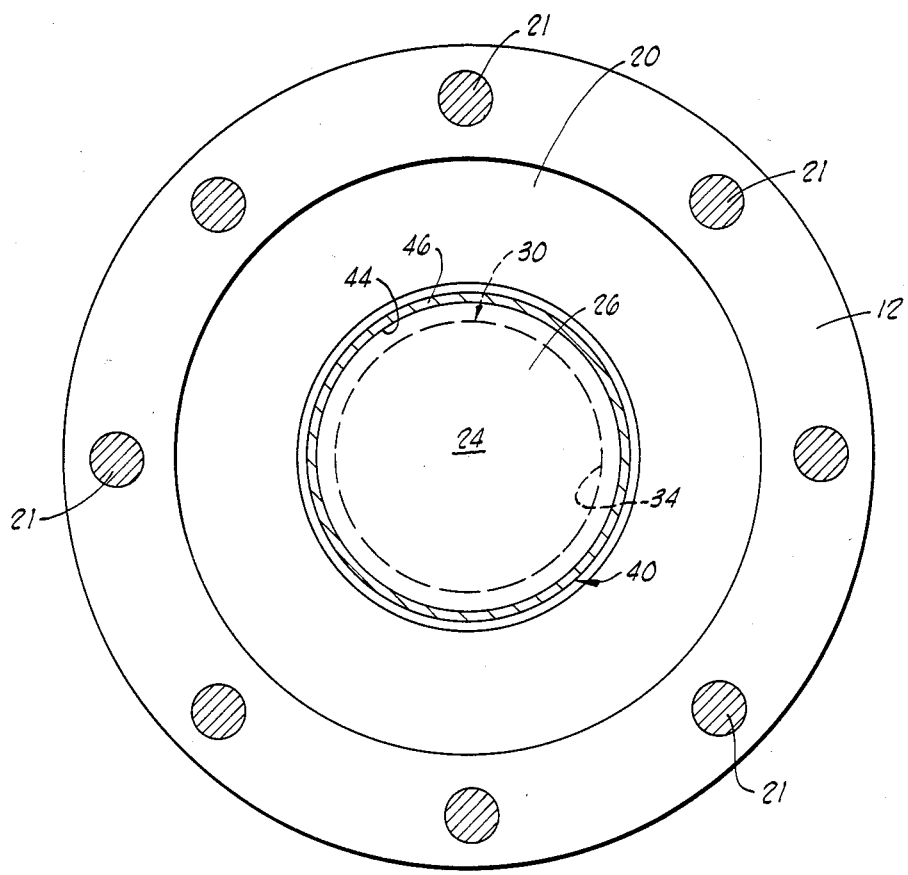
FIG. 2 is a cross-sectional view taken along line 2—2 of FIG. 1.

Referring now to the drawings, and particularly to FIGS. 1 and 2, one form of the apparatus of the present invention is illustrated and generally designated by the numeral 10. The apparatus 10 is shown clamped between a pair of support members (conventional pipe flanges) 12 and 14 which are in turn connected by conduits 15 and 16 to first and second fluid pressure zones (not shown), respectively. As is the usual case, annular gaskets 18 and 20 are disposed between the support members 12 and 14 and the apparatus 10 and the support members 12 and 14 are clamped together by a plurality of studs 21 positioned in openings spaced around the periphery of the flanges and nuts 22.

The apparatus 10 is comprised of a circular solid rupture disk 24 formed of a flexible plastic material and prebulged to include a concave-convex portion 26 and an annular flat flange portion 28. Positioned adjacent the rupture disk 24 on one side thereof is a first rupture pressure control member 30, preferably formed of metal, which has an outside diameter corresponding with the outside diameter of the rupture disk 24 and which includes an annular flat flange portion 32 for coacting with the annular flat flange portion 28 of the rupture disk 24 and the annular gasket 18. The first rupture pressure control member 30 includes a centrally positioned circular opening 34 therein defined by an annulet 36. The intersection of the annulet 36 and the annular flange portion 32 of the control member 30 forms a rounded corner 38 adjacent the rupture disk 24.

The size of the centrally positioned opening 34 in the first rupture pressure control member 30 is smaller than the size of the opening in the support member 12. However, the opening 34 is of the particular size which causes the rupture of the disk 24 in the reverse rupture mode to take place at a desired pressure. That is, the fluid pressure or pressure differential required to be exerted on the opposite side of the rupture disk 24 from the control member 30 (from the second fluid pressure zone to the first fluid pressure zone) to cause the rupture disk 24 to rupture is determined by the particular size of the opening 34 in the control member 30.

Positioned on the opposite side of the rupture disk 24 from the first rupture pressure control member 30 is a second annular rupture pressure control member 40. The second rupture pressure control member 40 is similar to the first rupture pressure control member 30 and includes an annular flange portion 42 for coacting with the annular flange portion 28 of the rupture disk 24 and the gasket 18. Like the first control member 30, the second control member 40 includes a centrally positioned circular opening 44 therein defined by an annulet 46 which is smaller than the size of the opening in the support member 14. The intersection of the annulet 46 with the annular flange portion 42 forms a rounded corner 48 adjacent the rupture disk 24.

The size of the opening 44 controls the predetermined rupture pressure of the rupture disk 24 in the normal rupture mode, i.e., from the first pressure zone by way of the conduit 15 and inlet flange 12 to the second pressure zone by way of the flange 14 and conduit 16.

OPERATION OF THE APPARATUS 10

The apparatus 10 will rupture in either the normal rupture mode or the reverse rupture mode depending upon the direction of the fluid pressure differential exerted thereacross and the predetermined rupture pressure of the apparatus 10 in such direction.

In the embodiment illustrated in FIGS. 1 and 2, the apparatus 10 has a lower rupture pressure in the normal rupture mode than in the reverse rupture mode. The reason for this is that the central opening 44 in the second rupture pressure control member 40 is of larger diameter than the central opening 34 in the first rupture pressure control member 30.

The prebulged portion 26 of the rupture disk 24 flexes towards the zone having the lowest fluid pressure and when the fluid pressure differential exerted across the rupture disk 24 exceeds the rupture pressure of the apparatus 10 in the direction of the pressure differential, the rupture disk 24 ruptures and pressure is relieved through the apparatus 10.

As will now be understood, if the apparatus 10 is designed to rupture in the normal rupture mode at a higher pressure than in the reverse rupture mode, the diameter of the opening 44 in the second rupture control member 40 is smaller than the diameter of the opening 34 in the first rupture control member 30. The particular diameters of the openings 34 and 44 selected for the rupture control members 30 and 40 depends upon the particular rupture pressures required in the reverse and normal rupture modes, respectively.

MANUFACTURE OF THE APPARATUS 10

The size of the support members 12 and 14 within which the apparatus 10 is to be clamped and the particular rupture pressures at which the apparatus 10 is to rupture in both the normal and reverse rupture modes are considered in selecting a rupture disk 24. That is, the material forming the rupture disk 24 and the thickness and consequent strength thereof are selected by testing disks of various materials and thicknesses in test support members to determine which disks rupture at a rupture pressure lower than that required for the apparatus 10 in the normal or reverse rupture modes when the openings in the control members 30 and 40 are of as large a size as possible while still being smaller than the sizes of the openings in the support members; and at a rupture pressure above the rupture pressures required in either mode when the openings in the control members 30 and 40 are as small as possible while still allowing a flow of fluid through the apparatus 10 sufficient to lower the fluid pressure in a zone containing excess fluid pressure. The ultimately selected rupture disk 24 meeting the above criteria is then tested in the testing apparatus with control members 30 and 40 having various sizes of openings 34 and 44 therein until the particular sizes of openings to bring about the particular rupture pressures required in the normal and reverse rupture modes are determined. Once the diameters of the openings are determined, the required quantity of apparatus 10 having such predetermined rupture pressures are quickly and simply manufactured. That is, the control members 30 and 40 can be stamped from sheet metal and the rupture disks 24 cut from a sheet of the particular material selected using simple and inexpensive equipment.

Figure 3:
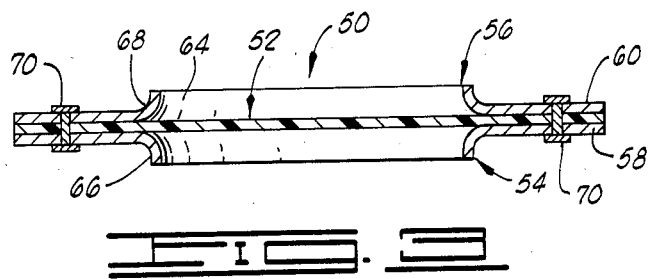
FIG. 3 is a side cross-sectional view of another form of the apparatus of the present invention.
Figure 4:
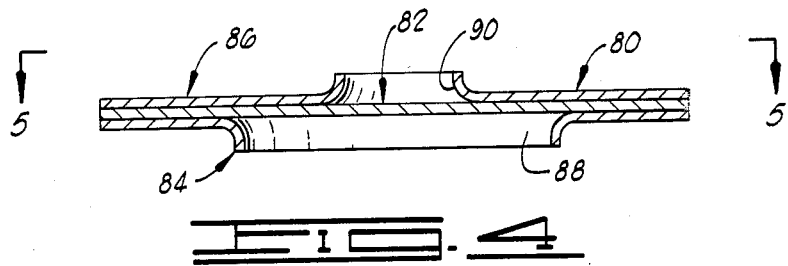
FIG. 4 is a side cross-sectional view of yet another form of the apparatus of the present invention.

Referring now to FIG. 3, an alternate embodiment of the present invention is illustrated and generally designated by the numeral 50. The apparatus 50 is similar to the apparatus 10 described above, except that it is designed to rupture at the same rupture pressure in both the normal and reverse rupture modes and includes a flat rupture disk formed of plastic material. More specifically, the apparatus 50 is an assembly of a flat circular rupture disk 52 and first and second annular rupture pressure control members 54 and 56. The control members 54 and 56 both include annular flat flange portions 58 and 60, respectively, and centrally positioned circular openings 62 and 64, respectively, which are both smaller than the openings in the support members (not shown) within which the apparatus 50 is to be clamped. The openings 62 and 64 are defined by annulets 66 and 68 with rounded corners at the intersections thereof with the annular flat flange portions.

The apparatus 50 will rupture at the same rupture pressure in the normal and reverse rupture modes since the openings 62 and 64 in the control members 54 and 56 are of the same diameter. Because the rupture disk 52 does not include a preformed concave-convex section as does the rupture disk 24 of the apparatus 10, it will rupture at a generally higher rupture pressure than the rupture disk 24 with all other variables being equal. The apparatus 50 also includes a plurality of rivets 70 positioned through spaced openings in the peripheral portion thereof to hold the various parts thereof together.

Figure 5:
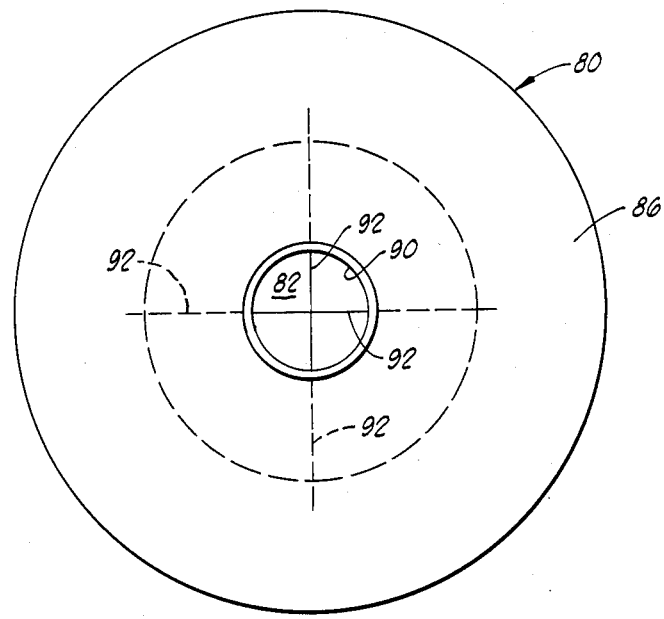
FIG. 5 is a cross-sectional view taken along line 5—5 of FIG. 4.

Referring now to FIGS. 4-7, yet another embodiment of the apparatus of the present invention is illustrated and generally designated by the numeral 80. The apparatus 80 is similar to the apparatus 10 and 50 described above and is an assembly of a rupture disk 82 between first and second annular rupture pressure control members 84 and 86. The apparatus 80 is designed to rupture in the reverse rupture mode at a lower pressure than in the normal rupture mode, and consequently, the first rupture control member 84 includes a central opening 88 formed therein of relatively large diameter as compared to the central opening 90 formed in the second rupture control member 86. The rupture disk 82 of the apparatus 80 is flat and is formed of metal. In addition, and as shown in FIG. 5, the rupture disk 82 includes scores 92 on a surface thereof forming lines of weakness in the central portion of the disk 82. Preferably, as shown in FIG. 5, the scores 92 divide the central portion of the disk 82 into quadrants, the scores intersect at the center of the disk 82 and the scores extend radially outwardly from the center beyond the largest of the central openings in the first and second control members 84 and 86, i.e., past the periphery of the opening 88 in the first control member 84.

OPERATION OF THE APPARATUS 80

Figure 6:
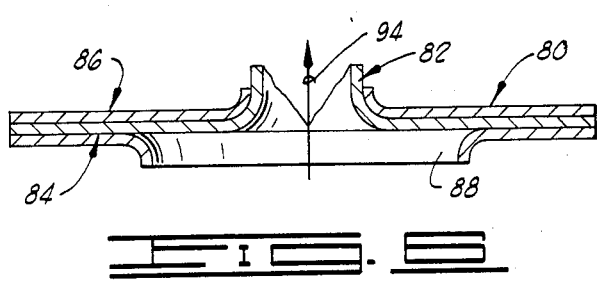
FIG. 6 is a side cross-sectional view of the apparatus of FIGS. 4 and 5 after rupture in the normal rupture mode.
Figure 7:
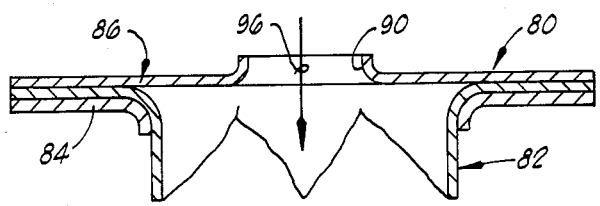
FIG. 7 is a side cross-sectional view of the apparatus of FIGS. 4 and 5 after rupture in the reverse rupture mode.

In operation of the apparatus 80, when a pressure differential is exerted on the apparatus 80 in the direction of the normal rupture mode (the direction indicated by the arrow 94 on FIG. 6) which is greater than the rupture pressure of the apparatus 80 in the normal rupture mode, the rupture disk 82 tears along the lines of weakness formed by the scores 92 therein and opens in sectors through the opening 90 in the second control member 86 as illustrated in FIG. 6. When a pressure differential greater than the reverse rupture pressure of the apparatus 80 is exerted on the rupture disk 82 in the direction of the reverse rupture mode (in the direction of the arrow 96 shown in FIG. 7), the rupture disk 82 tears along the lines of weakness formed by the scores 92 and opens in sectors through the opening 88 of the first rupture control member 84.

The rupture disk 82 formed of metal is required in higher pressure applications than the rupture disks 24 and 52 of the apparatus 10 and 50 which are formed of plastic. The scores 92 are included on the rupture disk 82 to substantially prevent the fragmentation of the disk upon rupture.

Figure 8:
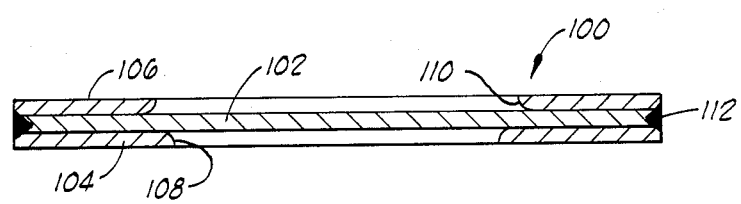
FIG. 8 is a side cross-sectional view of still another form of the apparatus of the present invention.

Referring now to FIG. 8, still another form of the apparatus of the present invention is illustrated and generally designated by the numeral 100. The apparatus 100 is similar to the apparatus 80 described above in that it is an assembly of a flat rupture disk 102 formed of metal between first and second annular rupture pressure control members 104 and 106, respectively. The first rupture pressure control member 104 includes a central circular opening 108 therein which is smaller than the central circular opening 110 in the second rupture pressure control member 106, and consequently, the apparatus 100 ruptures in the reverse rupture mode at a higher pressure than in the normal rupture mode. The circular openings 108 and 110 in the rupture pressure control members 104 and 106 both are smaller than the openings in the support members (not shown) within which they are to be clamped and both include rounded edges on the sides thereof adjacent the rupture disk 102. The control members 104 and 106 of the apparatus 100 do not include annulets attached thereto, and in addition, the control members 104 and 106 are welded to each other and to the rupture disk 102 at the peripheries thereof by a fusion weld 112. The rupture disk 102 can include or not include scores on a surface thereof depending upon the particular application of the apparatus 100, etc.

Figure 9:
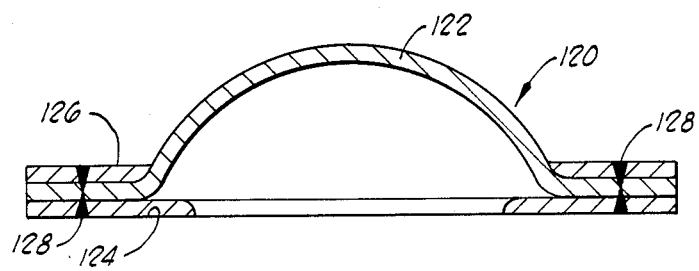
FIG. 9 is a side cross-sectional view of an alternate form of the apparatus of the present invention.

Referring now to FIG. 9, an alternate form of the apparatus of the present invention is illustrated and generally designated by the numeral 120. The apparatus 120 is similar to the apparatus 100 described above in that it includes a metal rupture disk 122 positioned between first and second rupture pressure control members 124 and 126. Instead of being flat, however, the rupture disk 122 includes a crowned portion which can include scores or not include scores. The rupture disk 122 and control members 124 and 126 are held together by a plurality of spot welds 128.

Figure 10:
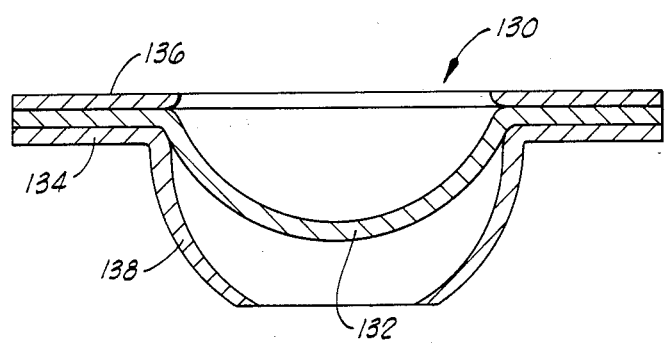
FIG. 10 is a side cross-sectional view of another alternate form of the apparatus of the present invention.

Yet another alternate form of the apparatus of this invention is illustrated in FIG. 10 and generally designated by the numeral 130. The apparatus 130 is an assembly of a scored or non-scored crowned metal rupture disk 132 between first and second rupture pressure control members 134 and 136. The first rupture pressure control member 134 includes a rounded sleeve 138 attached thereto for protecting the crowned portion of the rupture disk 132 from being damaged during handling or installation.

As will be understood by those skilled in the art, all of the various assemblies of the present invention can have the parts thereof held together by rivets, continuous or spot welds or other means. In addition, in all of the various embodiments described above, the rupture pressures for a particular rupture disk in the normal and reverse rupture modes are determined by the sizes of the openings in the rupture pressure control members which are always smaller than the openings in the support members between which the rupture disk and control members are to be clamped. The rupture disks utilized can be formed of plastic, metal or other material and can be scored or non-scored. The method of manufacture of all the embodiments of the invention described above is the same as that described above in connection with the apparatus 10.

In order to facilitate a clear understanding of the present invention, the following example is given.

EXAMPLE

The rupture disk 122 of the apparatus 120 (FIG. 9) has an outside diameter of 4.990 inches and is formed of 0.005 inch thick nickel material. A 3.0 diameter central portion of the disk is preformed into a concave-convex section having a crown height of 0.571 inch. The first rupture control member 124 includes a central opening therein of a diameter of 2.25 inches and the second rupture control member 126 includes a central opening therein of a diameter of 3.0 inches. Both the control members 124 and 126 are formed of 316 stainless steel, 0.03 inch thick. When installed in support members of 3-inch nominal size having openings therein of diameters greater than 3.0 inches, the apparatus ruptures in the normal rupture mode at a rupture pressure of 367 psig and in the reverse rupture mode at a rupture pressure of 440 psig.

The same rupture disk 122, i.e., a 4.990 inch diameter disk formed of 0.005 inch thick nickel material, with the same preformed concave-convex portion is capable of rupturing in either the normal or reverse rupture mode at a rupture pressure as low as 367 psig or as high as 497 psig, depending upon the particular sizes of the openings in the rupture pressure control members 124 and 126.

In a 3 inch nominal size, apparatus of this invention can achieve rupture pressures as low as about 44 psig or as high as about 5000 psig, depending upon the rupture disk material, thickness and configuration used as well as the particular sizes of the openings in the rupture pressure control members used therewith.

Thus, the present invention is well adapted to carry out the objects and attain the ends and advantages mentioned as well as those inherent therein. While presently preferred embodiments of the invention have been described for purposes of this disclosure, numerous changes can be made in the construction and arrangement of parts, which changes are encompassed within the spirit of this invention as defined by the appended claims.

What is claimed is:

1. A rupturable fluid pressure relief apparatus capable of rupturing in either the normal or reverse rupture modes at predetermined rupture pressures and adapted to be clamped between a pair of annular support members comprising:

a circular rupture disk;

a first annular rupture pressure control member positioned adjacent said rupture disk, said first control member including a centrally positioned opening therein of a size smaller than the sizes of the openings in said support members but of a particular size such that said rupture disk ruptures at a predetermined rupture pressure exerted on the side of said rupture disk opposite said control member; and a second annular rupture pressure control member positioned adjacent said rupture disk on the opposite side thereof from said first rupture pressure control member, said second control member including a centrally positioned opening therein of a size smaller than the sizes of the openings in said support members but of a particular size such that said rupture disk ruptures at a predetermined rupture pressure exerted on the side of said rupture disk opposite said second control member.

2. The apparatus of claim 1 wherein the openings in said first and second rupture pressure control members are circular and include rounded edges on the sides thereof adjacent said rupture disk.

3. The apparatus of claim 2 wherein said first and second rupture pressure control members are formed of metal.

4. The apparatus of claim 3 wherein said rupture disk is formed of plastic material.

5. The apparatus of claim 4 wherein said rupture disk is prebulged.

6. The apparatus of claim 3 wherein said rupture disk is formed of metal and is further characterized to include scores on a surface thereof defining lines of weakness therein.

7. The apparatus of claim 6 wherein said scores divide the central portion of said rupture disk into quadrants.

8. The apparatus of claim 2 wherein said rupture disk is flat.

9. A rupturable fluid pressure relief apparatus capable of rupturing and relieving fluid pressure in either direction between first and second fluid pressure zones at predetermined rupture pressures comprising:

a first annular support member sealingly communicated with said first fluid pressure zone;

a second annular support member sealingly communicated with said second fluid pressure zone;

a rupture disk assembly positioned between said first and second annular support members comprising:

a circular rupture disk of a size larger than the openings in said first and second support members;

a first annular rupture pressure control member positioned adjacent said rupture disk, said control member including a centrally positioned opening therein of a size smaller than the sizes of the openings in said first and second support members but of a particular size such that said rupture disk ruptures at a predetermined rupture pressure exerted on the side of said rupture disk opposite said first control member; and a second annular rupture pressure control member positioned adjacent said rupture disk on the opposite side thereof fronm said first rupture pressure control member, said second control member including a centrally positioned opening therein of a size smaller than the sizes of the openings in said first and second support members but of a particular size such that said rupture disk ruptures at a predetermined rupture pressure exerted on the side of said rupture disk opposite said second control member; and means for sealingly clamping said support members, together with said rupture disk assembly therebetween attached to said support members.

10. The apparatus of claim 9 wherein said first and second rupture pressure control members are formed of metal.

11. The apparatus of claim 9 wherein said rupture disk is flat.

12. The apparatus of claim 11 wherein said rupture disk is prebulged.

13. The apparatus of claim 10 wherein said rupture disk is formed of metal and is further characterized to include scores on a surface thereof defining lines of weakness therein.

14. The apparatus of claim 13 wherein said scores divide the central portion of said rupture disk into quadrants.

15. The apparatus of claim 10 wherein said rupture disk is formed of plastic material.

16. A method of manufacturing a group of rupturable fluid pressure relief apparatus capable of rupturing in the normal or reverse rupture modes at required predetermined normal and reverse rupture pressures comprising the steps of:

(a) determining the material, thickness and configuration of a rupture disk which will rupture at a rupture pressure lower than the lowest normal or reverse required predetermined rupture pressure when said rupture disk is clamped adjacent a rupture pressure control member having an opening therein of the largest usable size and which will rupture at a rupture pressure higher than the highest required predetermined normal or reverse rupture pressure when said rupture disk is clamped adjacent a rupture pressure control member having a central opening therein of the smallest usable size;

(b) determining the sizes of central openings in rupture pressure control members clamped adjacent a rupture disk of the material, thickness and configuration determined in step (a) above to cause said rupture disk to rupture in the normal and reverse rupture modes at said required predetermined rupture pressures;

(c) producing a group of rupture disks of the material, thickness and configuration determined in step (a) above;

(d) producing a group of rupture pressure control members having the size of central opening therein which causes said rupture disks to rupture at the required predetermined rupture pressure in the normal rupture mode as determined in step (b);

(e) producing a group of rupture pressure control members having a size of central opening therein which causes said rupture disks to rupture at the required predetermined rupture pressure in the reverse rupture mode as determined in step (b); and (f) assembling each of the rupture disks produced in step (c) with a rupture pressure control member produced in step (d) on one side thereof and a rupture pressure control member produced in step (e) on the other side thereof.

17. The method of claim 16 wherein said rupture pressure control members produced in accordance with steps (d) and (e) are formed of metal.

18. The method of claim 17 wherein said rupture disks produced in accordance with step (c) are formed of plastic material.

19. The method of claim 17 wherein said rupture disks produced in accordance with step (e) are formed of metal.

20. The method of claim 19 wherein said rupture disks include scores on a surface thereof.

21. The method of claim 17 wherein said rupture pressure control members produced in accordance with steps (d) and (e) include central openings therein defined by annulets formed thereon.

22. The method of claim 17 wherein said rupture pressure control members produced in accordance with steps (d) and (e) include rounded sides defining the central openings therein.

* * * * *

UNITED STATES PATENT AND TRADEMARK OFFICE
CERTIFICATE OF CORRECTION

PATENT NO. : 4,795,051
DATED : January 3, 1989
INVENTOR(S) : Sam A. Ou

It is certified that error appears in the above-identified patent and that said Letters Patent hereby corrected as shown below:

Column 9, line 34 (claim 13), change "11" to --15--.

Signed and Sealed this

Fourth Day of July, 1989

Attest:

DONALD J. QUIGG

Attesting Officer

Commissioner of Patents and Trademarks